2,933,211

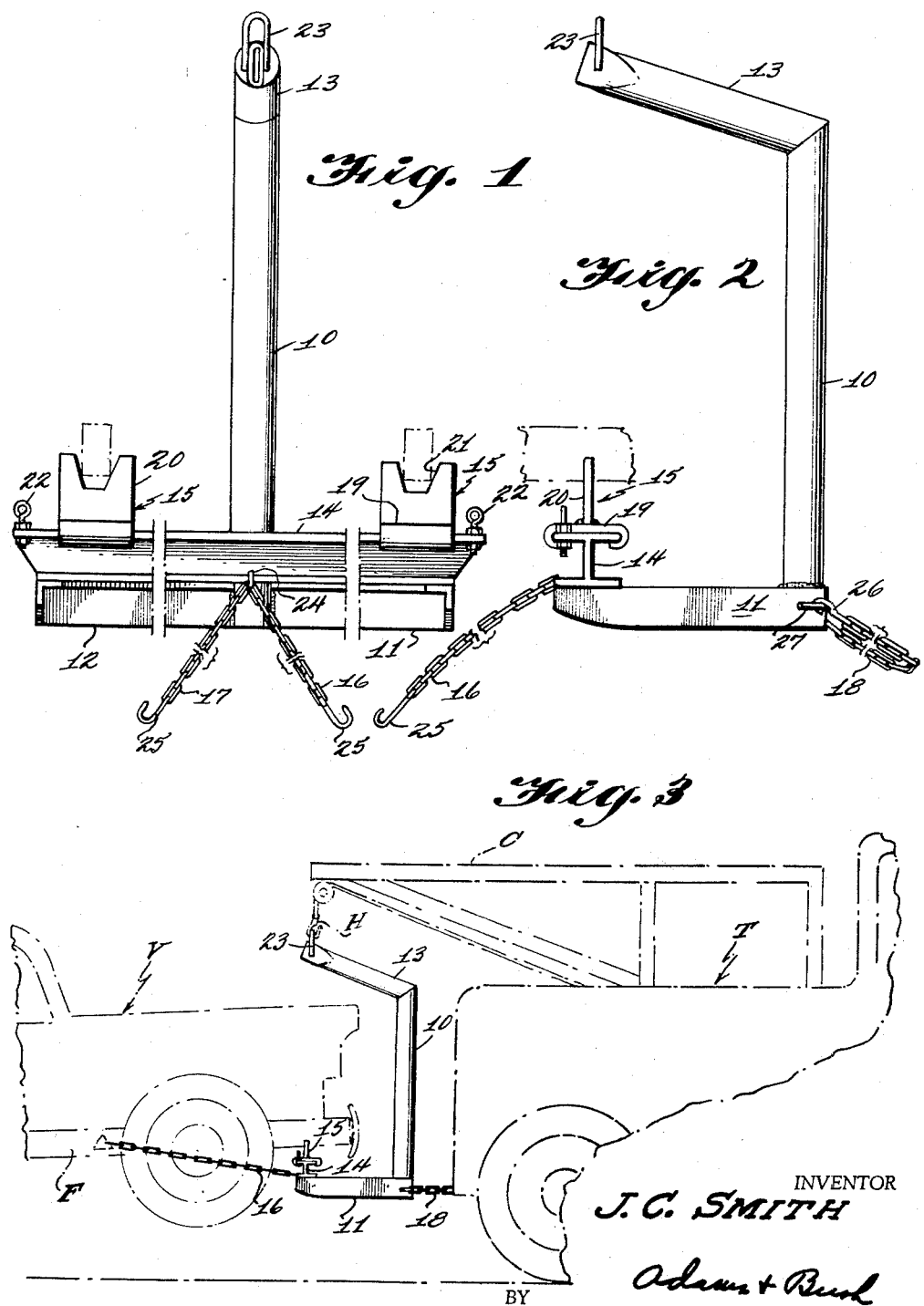

LIFTING AND TOWING CRADLES

J C. Smith, Oxford, Ga.

Application March 12, 1958, Serial No. 720,997

3 Claims. (Cl. 214—86)

This invention relates to towing and lifting apparatus and has more particular reference to a towing and lifting cradle adapted to be connected to the front or rear end of a disabled vehicle and held in an elevated position by a crane on the towing car while being towed.

One object of the present invention is to provide a novel and improved vehicle towing and lifting cradle adapted to be supported from the crane of a towing car and connected to the front or rear end of a disabled vehicle so that the end of the disabled vehicle to which the cradle is attached may be lifted and the vehicle towed away by the towing car.

Another object of the invention is to provide a towing cradle, as characterized above, including a rigid cross arm adapted to be positioned beneath the ends of the frames at the end of the disabled vehicle to be lifted; a pair of dogs mounted on the cross arm for engaging the frame members; a rigid upright member; means including at least one rigid laterally extending arm connecting the cross arm to the lower end of the upright member, an upper rigid arm connected to the upper end of the upright member and extending laterally and upwardly therefrom to a point positioned above the center of the cross arm; means carried by the outer end of the upper arm for detachable connection to a hoisting cable of a tow car; chain means for securing the cross arm to the disabled vehicle; and chain means for detachably securing the lower end of the upright member to the tow car so that the tow car can tow the disabled vehicle.

Another object of the present invention is to provide a towing cradle, as characterized above, wherein the pair of dogs mounted on the cross arm to receive the frame members of the disabled vehicle are slidably adjustably mounted thereon so that the cradle may be mounted on vehicles having longitudinal frame members spaced different distances apart.

Another object of the present invention is to provide a towing cradle, as characterized above, which is portable and light weight that the operator of the tow car can carry it to the disabled vehicle and mount it thereon.

A further object of the present invention is to provide a towing cradle, as characterized above, which is simple and rugged in construction, easily mounted for operation, and efficient in use.

Other objects and advantages of the invention will appear in the following specification when considered in connection with the accompanying drawing, wherein:

Fig. 1 is an end elevational view, with parts broken away, of a vehicle lifting and towing cradle constructed in accordance with the present invention;

Fig. 2 is a side elevational view of the apparatus shown in Fig. 1; and

Fig. 3 is a side elevational view showing the manner in which the towing and lifting cradle shown in Fig. 1, is attached to a disabled vehicle and a towing car, the towing car and the disabled vehicle being shown in dotted lines.

The present invention provides a novel and improved lifting and towing cradle adapted to be connected to the front or rear end of a disabled vehicle and a towing car so that the towing car may lift the disabled vehicle and tow it away for repairs.

In general, the lifting and towing cradle comprises an upright rigid member having a rigid upper arm and at least one rigid lower arm secured to its upper and lower ends, respectively, and projecting laterally from one side thereof; a cross arm mounted on the lower arm and carrying adjustable dogs in which the longitudinal frame members of the disabled vehicle are to be received; suitable means carried by the upper arm for connecting the cradle to the hoisting cable of the tow car crane; suitable means for connecting the cradle to the frame of the tow car for pulling the cradle and the disabled vehicle; and suitable means for securing the cradle to a fixed rigid part of the disabled vehicle so that the cradle will not be pulled out of position while the disabled vehicle is being towed.

Referring now to the drawings, there is illustrated, in Fig. 1, one embodiment of a lifting and towing cradle constructed in accordance with the present invention. As there shown, the cradle comprises a rigid upright member 10; a pair of rigid lower arms or members 11, 12 fixedly connected to and extending laterally from the bottom end of the upright member 10 in divergent relation; a rigid upper arm or member 13 fixedly connected to the upper end of the upright member 10 and extending laterally and upwardly therefrom; a cross arm 14 mounted on and rigidly secured to the outer end portions of the two lower arms 11 and 12; a pair of dogs or socket members 15 slidably adjustably mounted on the cross arm 14; a pair of chains 16 and 17 connected to the cross arm intermediate its ends; and a chain 18 connected to the bottom end of the upright 10.

While the upright 10, the upper and lower arms 11, 12 and 13, and the cross arm 14 may be made of any suitable material, preferably and as shown, the upright 10 and upper arm member 13 are made of sections of hollow metal pipe suitably secured together, as by welding, or they may be made of a single piece of pipe.

The lower arms 11 and 12, preferably and as shown, are made of angle iron and their inner ends are suitably secured, as by welding, to the bottom end of the upright member 10 on opposite sides thereof and extend laterally therefrom in a divergent relationship, preferably and as shown, at an acute angle.

The cross arm 14, preferably and as shown, is made of a section of an I-beam and is mounted on the upper outer end portions of the lower arm members 11 and 12 and suitably secured thereon, as by welding.

The dogs or socket members 15 are identical in construction and, as shown, each comprises a flat metal plate 19 having opposed edge portions turned downwardly and inwardly to slidably embrace the longitudinal edges of the top flange of the cross arm 14; an upright metal plate 20 extending transversely of and rigidly secured, as by welding, to the upper surface of the plate 19 and have a \_/-shaped recess 21 formed in its upper edge.

The foregoing construction permits the dogs to be slidably adjusted on the cross arm so that they may be properly positioned to receive the longitudinal frame members of the disabled vehicle in the recesses formed in the dogs. A pair of eye bolts 22, one mounted at each other end of the top flange of the cross arm 14, retain the dogs on the cross arm.

The upper arm 13 extends laterally and upwardly from the upper end of the upright member 10 and to an extent and in a direction so that the outer end extends over the transverse center line of the cross arm 14. A metal lifting loop 23 is suitably secured to the top of the upper arm 13 at a point diametrically above the intersection of the longitudinal and transverse axes of the cross arm 14.

The pair of chains 16 and 17 each have their inner end attached to a retaining ring 24 suitably secured to the lower flange of the cross arm 14 at a point midway of its ends. Each of the chains 16 and 17 has a hook 25 connected in its outer end to facilitate securing the chains to a fixed part of the disabled vehicle.

The chain 18 has one end fixedly secured to the inner end of the lower arm 12 and has a hook 26 connected to its free end so that the chain can be passed around or through a member fixed to the towing car and then have the hook 26 secured in a retaining loop 27 fixedly mounted on the inner end of the lower arm member 11.

The manner in which the towing cradle is employed with a tow car for lifting and towing a disabled vehicle is illustrated in Fig. 3. As there shown, the cradle has been mounted on the disabled vehicle V with the lower arms 11 and 12 projecting under the front end of the vehicle so that the cross arm 14 extends transversely of the longitudinal frame members F of the vehicle and with the forward end portions of the frame members received in the recess 21 formed in the dogs 15 carried by the cross arm 14. The upper arm of the cradle projects upward, clear of the hood of the disabled vehicle, and the lifting loop 23 on its outer end is connected to the hook H of the lifting cable of the crane C mounted on the tow car T. The securing chains 16 and 17 are shown as having their hooks 24 secured in lighter holes in the frame of the vehicle. If desired, the chains could be passed around the front axle of the vehicle and then have their hooks secured in the eyes of the eye bolts 22 on the outer ends of the cross arm 14.

The towing chain 18 has been passed around a suitable retaining fixture secured to the tow car and then has its hook 26 secured to the retaining loop 27 on the bottom of the upright 10. The cradle, and by it, the front end of the vehicle has been lifted and the disabled vehicle is now ready to be towed away. In connection with the foregoing, it should be noted that, due to the positioning of the lifting loop 23 directly above the center of the cross arm 14, the upward lift is vertical and there will be no tilting of the cradle or the disabled vehicle.

Normally, the towing cradle would be carried to the location of the disabled vehicle on the towing car, with the hook on the towing cable connected to the lifting loop on the upper arm of the cradle and with the cradle resting on the floor of the truck body of the towing car. On arrival at the location of the disabled vehicle the cradle is lifted out of the towing car by the towing crane and lowered in position at the end of the disabled vehicle to which it is to be attached. The lower arms of the cradle are pushed under the end of the disabled vehicle be lifted so that the cross arm will be below the longitudinal frame members and the dogs are adjusted so that the longitudinal frame members are seated and partially wedged in the recesses formed in the dogs. Then, the chains 16 and 17 are secured to the disabled vehicle as by being wrapped around the adjacent axle of the vehicle and then securing the hooks in their free ends to the eye bolts on the ends of the cross arm, or, as shown in Fig. 3, by securing the hooks in lighter holes in the frame members F. Then the cradle is hoisted by the lifting cable of the crane, thus lifting the end of the disabled vehicle. Next, the towing chain 18 is secured to the towing car and the disabled vehicle is towed away.

In connection with the foregoing, it may be pointed out that it is not necessary that the towing car be lined up with the disabled vehicle or that the vehicle be on level ground before the towing cradle is attached, as the towing cradle is portable and does not weigh over 100 pounds and can be carried to the disabled vehicle and mounted thereon by the towing car operator. This is particularly advantageous when the disabled vehicle is in a ditch and must be pulled out before being towed away. In such case, the towing car operator carries the towing cradle to the disabled vehicle, fastens the cradle to the disabled vehicle as outlined above, attaches the towing cable from the crane to the towing cradle, and pulls the disabled vehicle out of the ditch onto the roadway. While the disabled vehicle is being dragged back onto the roadway, the cradle will be dragging on the ground, not the car; however, due to its rugged construction it will not be damaged.

From the foregoing, it readily will be seen that there has been provided a novel and improved towing cradle for use with a tow car for lifting and towing a disabled vehicle; one which is portable and light weight so that it can be handled by the operator of the tow car and mounted on the disabled vehicle without the tow car being lined up with the vehicle; one which may easily be mounted on the front or rear end of the disabled vehicle and which engages the longitudinal frame members of the vehicle for lifting, without damage to the grille or bumpers of the vehicle, and one which is simple and strong in construction and extremely efficient in operation.

Obviously, the invention is not restricted to the particular embodiment thereof herein shown and described.

What is claimed is:

1. A portable lifting and towing cradle for use with a tow car having a crane provided with a hoisting cable for lifting and towing a disabled vehicle comprising an elongated rigid cross arm adapted to be positioned beneath the end of the vehicle to be lifted; a pair of adjustable dogs slidably mounted on said cross arm, each having a recess formed therein in which one of the longitudinal frame members of the disabled vehicle is adapted to be received; a rigid upright member; means including at least one rigid laterally extending member connecting said cross arm to the lower end of said upright member; an upper rigid arm connected to the upper end portion of said upright member and extending outwardly and upwardly therefrom to a point positioned above the center of said cross arm; means carried by said upper arm for detachable connection to the hoisting cable of said tow car; means for securing said cross arm to said disabled vehicle including a pair of eye bolts mounted on said cross arm at each end and a pair of chains, each having its inner end secured to said cross arm and its outer end provided with a hook, said chains being adapted to be wrapped around the axle of the disabled vehicle adjacent which the cross arm is mounted and then secured to the eye bolts on said cross arm; and tow means for securing said upright member at its bottom end portion to said tow car.

2. Apparatus as set forth in claim 1, wherein the means for connecting said cross arm to the bottom of said upright member comprises a pair of rigid arms having their inner ends fixedly connected to the bottom end portion of said upright member and extending laterally therefrom in diverging relation; and wherein said cross arm is fixedly mounted on and extends transversely across the outer end portions of said pair of rigid arms.

3. Apparatus as set forth in claim 1, wherein said cross arm includes an elongated flat plate and wherein said dogs each comprises a short flat plate having opposed edge portions turned downwardly and inwardly to slidably embrace the longitudinal edges of said elongated plate; and an upright plate fixedly mounted on and extending transversely of said short flat plate and provided with a \_/-shaped recess in its upper edge in which a longitudinal frame member of the disabled vehicle is adapted to be received.

References Cited in the file of this patent

UNITED STATES PATENTS

| | | |
|---|---|---|
| 597,438 | Schilling | Jan. 18, 1898 |
| 1,420,369 | Duhen | June 20, 1922 |
| 1,739,364 | Lake | Dec. 10, 1929 |
| 2,564,111 | Kimball | Aug. 14, 1951 |
| 2,625,279 | Dalby et al. | Jan. 13, 1953 |
| 2,690,926 | Betz | Oct. 5, 1954 |
| 2,833,430 | Collins | May 6, 1958 |